US008889292B2

(12) United States Patent
Kim et al.

(10) Patent No.: US 8,889,292 B2
(45) Date of Patent: Nov. 18, 2014

(54) RECHARGEABLE BATTERY

(75) Inventors: Duk-Jung Kim, Yongin-si (KR);
Joong-Heon Kim, Yongin-si (KR); In Kim, Yongin-si (KR); Chi-Young Lee, Yongin-si (KR)

(73) Assignees: Samsung SDI Co., Ltd., Yongin-Si, Gyeonggi-Do (KR); Robert Bosch GmbH, Stuttgart (DE)

( * ) Notice: Subject to any disclaimer, the term of this patent is extended or adjusted under 35 U.S.C. 154(b) by 228 days.

(21) Appl. No.: 13/403,066

(22) Filed: Feb. 23, 2012

(65) Prior Publication Data
US 2013/0095372 A1 Apr. 18, 2013

Related U.S. Application Data

(60) Provisional application No. 61/546,644, filed on Oct. 13, 2011.

(51) Int. Cl.
*H01M 2/26* (2006.01)
*H01M 2/20* (2006.01)
*H01M 2/18* (2006.01)
*H01M 10/04* (2006.01)
*H01M 2/34* (2006.01)

(52) U.S. Cl.
CPC ............... *H01M 2/34* (2013.01); *H01M 2/202* (2013.01); *H01M 2200/103* (2013.01); *Y02E 60/12* (2013.01); *H01M 2/18* (2013.01); *H01M 2/263* (2013.01); *H01M 10/0431* (2013.01)
USPC .......................................................... 429/211

(58) Field of Classification Search
None
See application file for complete search history.

(56) References Cited

U.S. PATENT DOCUMENTS

| 2003/0129479 | A1 | 7/2003 | Munenaga et al. |
| 2006/0051664 | A1 | 3/2006 | Tasai et al. |
| 2009/0297892 | A1 * | 12/2009 | Ijaz et al. ........................... 429/7 |
| 2011/0177387 | A1 | 7/2011 | Byun et al. |
| 2011/0183165 | A1 | 7/2011 | Byun et al. |
| 2011/0244280 | A1 * | 10/2011 | Byun et al. ....................... 429/61 |
| 2012/0135283 | A1 * | 5/2012 | Lee ................................. 429/82 |

FOREIGN PATENT DOCUMENTS

| EP | 2375475 A1 | 10/2011 |
| EP | 2458659 A1 | 5/2012 |
| JP | 11-354095 | 12/1999 |
| JP | 2002-100340 | 4/2002 |

OTHER PUBLICATIONS

European Search Report dated Feb. 1, 2013.
European Office Action dated Nov. 26, 2013.

* cited by examiner

*Primary Examiner* — Patrick Ryan
*Assistant Examiner* — Wyatt McConnell
(74) *Attorney, Agent, or Firm* — Lee & Morse, P.C.

(57) ABSTRACT

A battery includes a plurality of electrode assemblies, each having an electrode and an electrode uncoated region, such that the plurality of electrode assemblies together present a plurality of electrodes and electrode uncoated regions, an electrode terminal, and a current collecting member electrically connecting the electrode terminal and the plurality of electrodes of the electrode assemblies, the current collecting member including a terminal connection portion, and side plates, extending from lateral sides of the terminal connection portion, a plurality of current collecting plates, each current collecting plate contacting the electrode uncoated region of a respective one of the plurality of electrode assemblies, a plurality of supporting portions, each supporting portion connecting certain adjacent ones of the current collecting plates together, each of the side plates being coupled with at least one of the current collecting plates.

18 Claims, 10 Drawing Sheets

RECHARGEABLE BATTERY

CROSS-REFERENCE TO RELATED APPLICATION

The present application claims priority under 35 U.S.C. §119(e) to U.S. Provisional Application No. 61/546,644, filed on Oct. 13, 2011, and entitled: "Rechargeable Battery," which is incorporated herein by reference in its entirety.

BACKGROUND

1. Field

Embodiments relate to a rechargeable battery. More particularly, embodiments relate to a rechargeable battery including a current collecting member.

2. Description of the Related Art

A rechargeable battery is a battery that can be repeatedly charged and discharged, unlike a primary battery, which cannot be recharged.

A low-capacity rechargeable battery is used for a small portable electronic device such as a mobile phone, a laptop computer, and a camcorder. A large-capacity rechargeable battery is widely used as a power supply for driving a motor of a hybrid vehicle and the like.

Recently, a high-output rechargeable battery using a nonaqueous electrolyte solution with high energy density has been developed. The high-output rechargeable battery is configured of a large-capacity battery module in which a plurality of rechargeable batteries are connected to each other in series so as to be used to drive a motor of devices requiring large power, for example, an electric car, or the like.

The battery module is generally configured by the plurality of rechargeable batteries that are coupled with each other in series, and each of the rechargeable batteries may be formed in a cylindrical shape, a prismatic shape, and the like.

The above information disclosed in this Background section is only for enhancement of understanding of the background of the invention and therefore it may contain information that does not form the prior art that is already known in this country to a person of ordinary skill in the art.

SUMMARY

According to an embodiment, there is provided a battery, including a plurality of electrode assemblies, each having an electrode and an electrode uncoated region, such that the plurality of electrode assemblies together present a plurality of electrodes and electrode uncoated regions, an electrode terminal, and a current collecting member electrically connecting the electrode terminal and the plurality of electrodes of the electrode assemblies, the current collecting member including a terminal connection portion, and side plates, extending from lateral sides of the terminal connection portion, a plurality of current collecting plates, each current collecting plate contacting the electrode uncoated region of a respective one of the plurality of electrode assemblies, a plurality of supporting portions, each supporting portion connecting certain adjacent ones of the current collecting plates together, each of the side plates being coupled with at least one of the current collecting plates. Each of the side plates may be coextensive and integral with one of the current collecting plates.

The terminal connection portion may include a fuse portion, the fuse portion being a region of reduced area in the terminal connection portion. The terminal connection portion may include an electrode terminal contacting portion and a side plate connecting portion. The terminal connection portion may include bent lateral sides. The bent lateral sides of the terminal connection portion in the electrode terminal contacting portion may form lateral edge portions of the electrode terminal contacting portion. The bent lateral sides of the terminal connection portion in the side plate connecting portion may form the side plates.

The fuse portion may include a hole that extends between the bent lateral sides of the terminal connection portion.

The supporting portions may connect selected pairs of the current collecting plates together. The supporting portions may contact respective adjacent ones of the electrode assemblies. The supporting portions may each include a connecting part and guiding portions at lateral side ends of the connecting part. The guiding portions may connect the connecting part to the adjacent ones of the current collecting plates. The guiding portions may contact inclined faces of the electrode assemblies.

The guiding portions may each be bent in a shape of an arc extending between the connecting part and the adjacent ones of the current collecting plates. The guiding portions may each form an inclined angle between the connecting part and the adjacent ones of the current collecting plates. The inclined angle of each guiding portion matches an angle of the inclined faces of the electrode assemblies.

The supporting portions may include upper supporting portions that connect the adjacent ones of the current collecting plates at a proximal end of the current collecting plates relative to one of the side plates and lower supporting portions that connect the adjacent ones of the current collecting plates at a distal end of the current collecting plates.

The adjacent ones of the current collecting plates may include welding bar portions welded to the electrode uncoated regions of one of the electrode assemblies, bent bar portions, in which the adjacent ones of the current collecting plates bend inwardly toward each other, and insertion tip portions at lower ends of the adjacent ones of the current collecting plates. Each of the bent bar portions may bend at an angle of about 5° to about 90° with respect to one of the welding bar portions.

The welding bar portions and insertion tip portions of the adjacent ones of the current collecting plates may be parallel to each other. A distance between the insertion tip portions of the adjacent ones of the current collecting plates may be less than a distance between the welding bar portions of the adjacent ones of the current collecting plates.

Each of the lower supporting portions may connect together the welding bar portions of the adjacent ones of the current collecting plates at a location adjacent to the bent bar portions. Each of the lower supporting portions may connect the insertion tip portions of the adjacent ones of the current collecting plates.

The battery may further include a case within which the plurality of electrode assemblies and the current collecting member are disposed, and insulating members on portions of the current collecting member facing an inside surface of the case.

The current collecting plates, supporting portions, side plates, and the terminal connection portion of the current collecting member may be formed of a same material and may be integral with one another.

BRIEF DESCRIPTION OF THE DRAWINGS

Features will become apparent to those of ordinary skill in the art by describing in detail exemplary embodiments with reference to the attached drawings in which.

DETAILED DESCRIPTION

Figure 1:
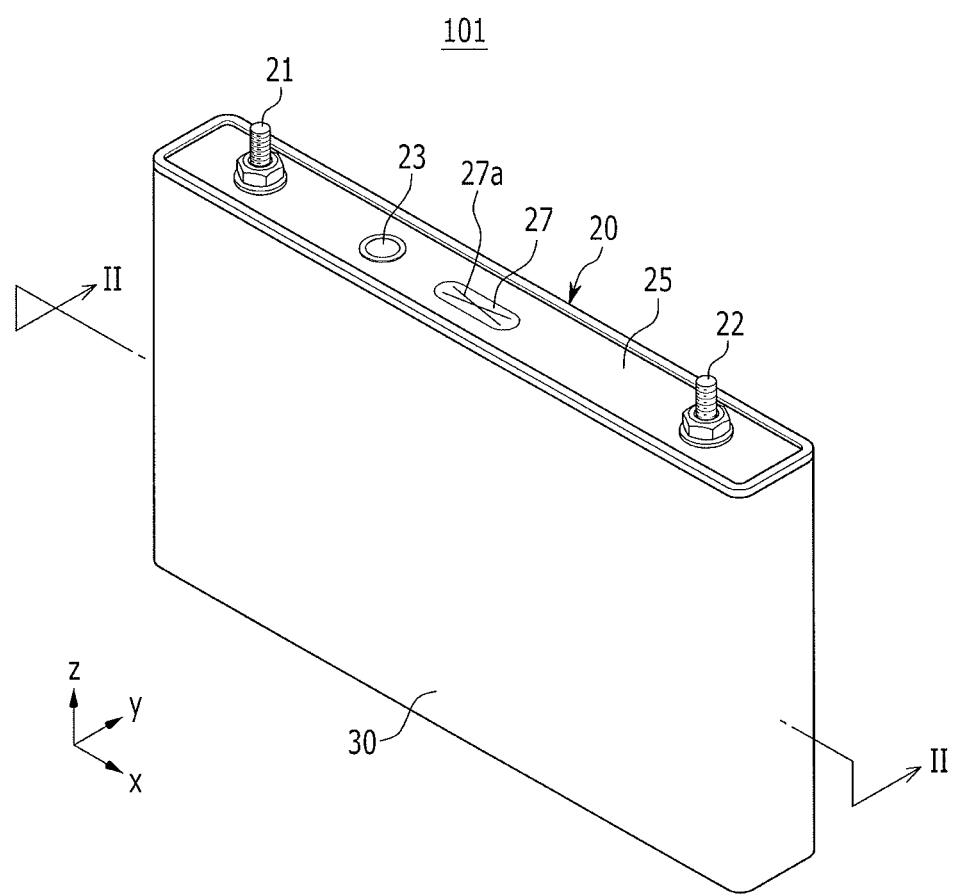
FIG. 1 illustrates a perspective view of a rechargeable battery according to an exemplary embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. Like reference numerals refer to like elements throughout.

Figure 2:
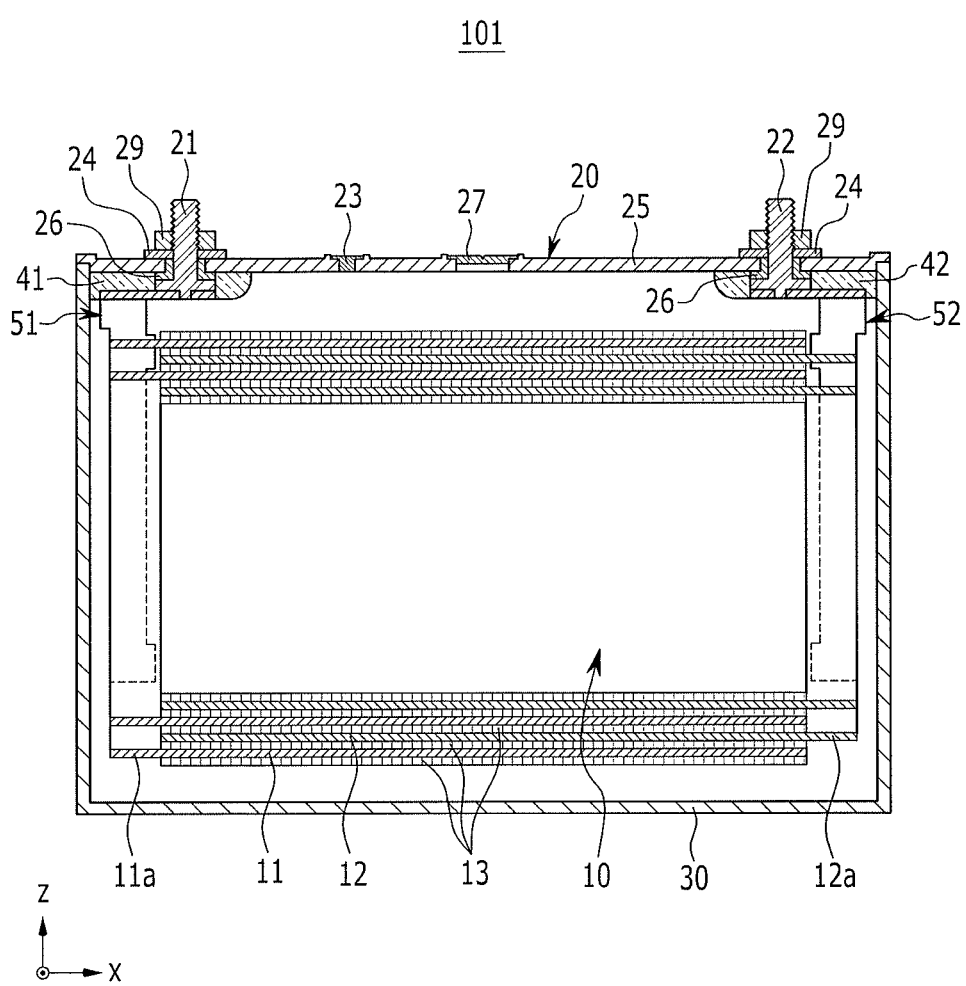
FIG. 2 illustrates a cross-sectional view of FIG. 1, taken along the line II-II.

FIG. 1 is a perspective view of a rechargeable battery according to an exemplary embodiment and FIG. 2 is a cross-sectional view of FIG. 1, taken along the line II-II.

Referring to FIG. 1 and FIG. 2, a rechargeable battery 101 according to the exemplary embodiment may include an electrode assembly 10 formed by winding a positive electrode 11 and a negative electrode 12, interposing a separator 13 therebetween, a case 30 in which the electrode assembly 10 is installed, and a cap assembly 20 coupled to the case 30.

The rechargeable battery 101 according to the exemplary embodiment may be exemplarily described as a lithium ion secondary battery having a prismatic shape. However, in other implementations, the rechargeable battery 101 may be another type of battery, such as a lithium polymer battery or may have another shape, such as a cylindrical shape.

The positive electrode 11 and the negative electrode 12 may include coated regions where an active material is coated to a current collector formed of a thin metal foil and uncoated regions 11a and 12a where the active material is not coated.

The positive electrode uncoated region 11a may be formed at a first side end of the positive electrode 11 along a length direction of the positive electrode 11, and the negative uncoated region 12a may be formed at a second side end of the negative electrode 12 along a length direction of the negative electrode 12. The positive electrode 11 and the negative electrode 12 may be spirally wound, interposing the separator 13 therebetween. The separator 13 may be an insulator.

However, various other implementations may be possible. For example, the electrode assembly 10 may have a structure in which a positive electrode and a negative electrode, each formed of a plurality of sheets, are alternately layered, interposing a separator therebetween.

The case 30 may be approximately formed in the shape of a cuboid, and an opening may be formed one side thereof. The cap assembly 20 may include a cap plate 25 covering the opening of the case 30, a positive terminal 21 protruding to an outer side of the cap plate 25 and electrically connected with the positive electrode 11, a negative terminal 22 protruding to an outer side of the cap plate 25 and electrically connected with the negative electrode 12, and a vent member 27 having a notch 27a formed to be broken according to a predetermined internal pressure.

The cap plate 25 may be formed of a thin plate. An electrolyte injection opening may be foamed at one side for injection of an electrolyte solution, and a sealing cap 23 is fixed to the cap plate 25 to seal the electrolyte injection opening.

The positive terminal 21 may be formed to penetrate the cap plate 25. Accordingly, a first gasket 24 formed in an upper portion of the cap plate 25 and a second gasket 26 formed in a lower portion of the ca plate 25 may insulate the cap plate 25 and the positive terminal 21.

The positive terminal 21 may be formed in the shape of a circular cylinder. A nut 29 may be formed in the positive terminal 21 to support the positive terminal 21 from an upper portion. A thread may be formed in an external circumference of the positive terminal 21 so as to be fastened with the nut 29.

The positive terminal 21 may be electrically connected with the positive electrode uncoated region 11a through a current collecting member 51. A terminal flange that supports the positive terminal 21 and the current collecting member 51 may be formed in a lower end of the positive terminal 21.

The negative terminal 22 may be formed penetrating the cap plate 25. Accordingly, a first gasket 24 formed in an upper portion of the cap plate 25 and a second gasket 25 formed in a lower portion of the cap plate 25 may insulate the cap plate 25 and the negative terminal 22.

The negative terminal 22 may be formed in the shape of a circular cylinder. A nut 29 may be formed in the negative terminal 22 to support the negative terminal 22 from an upper portion thereof. A thread may be formed in an external circumference of the negative terminal 22 so as to be fastened with the nut 29.

The negative terminal 22 may be electrically connected with the negative electrode uncoated region 12a through a current collecting member 52. A terminal flange may be formed in a lower end of the negative terminal 22 to support the negative terminal 22 and the current collecting member 52.

Figure 3:
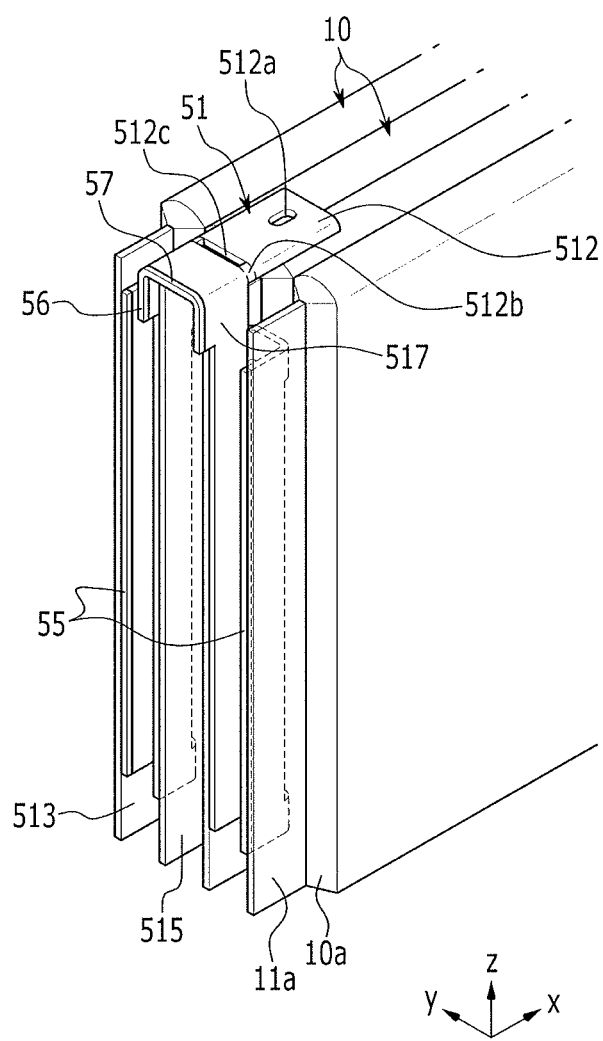
FIG. 3 illustrates a perspective view of a current collecting member and an electrode assembly of the rechargeable battery according to an exemplary embodiment.
Figure 4:
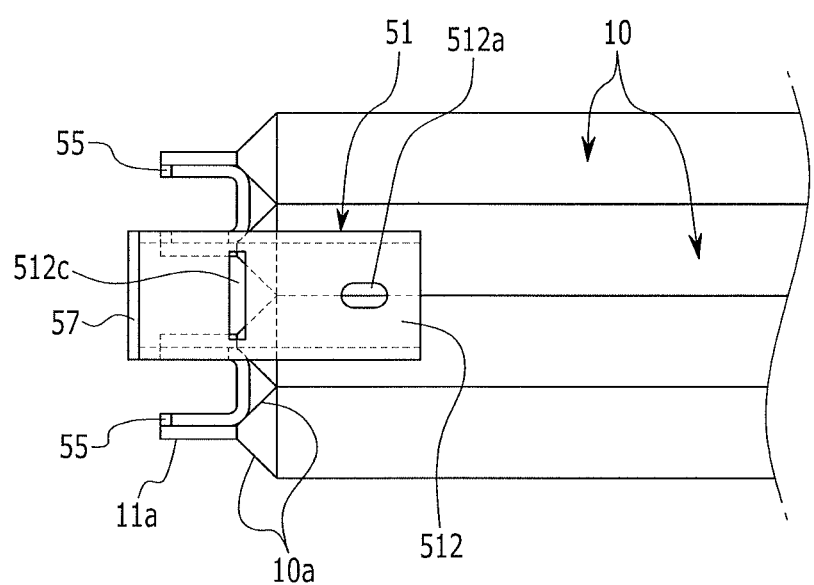
FIG. 4 illustrates a top view of the current collecting member and the electrode assembly of the rechargeable battery according to the exemplary embodiment.
Figure 5:
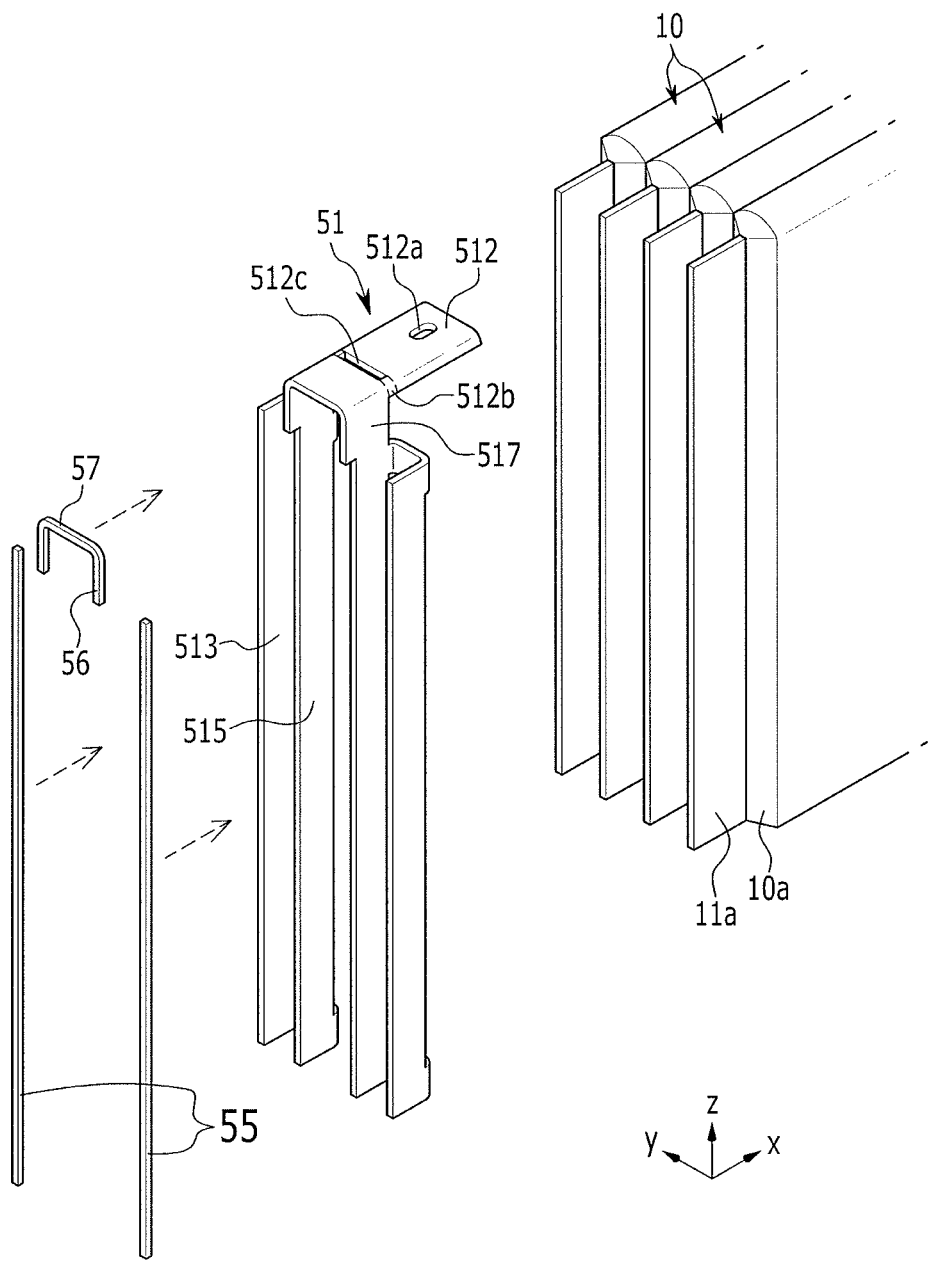
FIG. 5 illustrates an exploded perspective view of a current collecting member and an electrode assembly of the rechargeable battery according to the exemplary embodiment.
Figure 6:
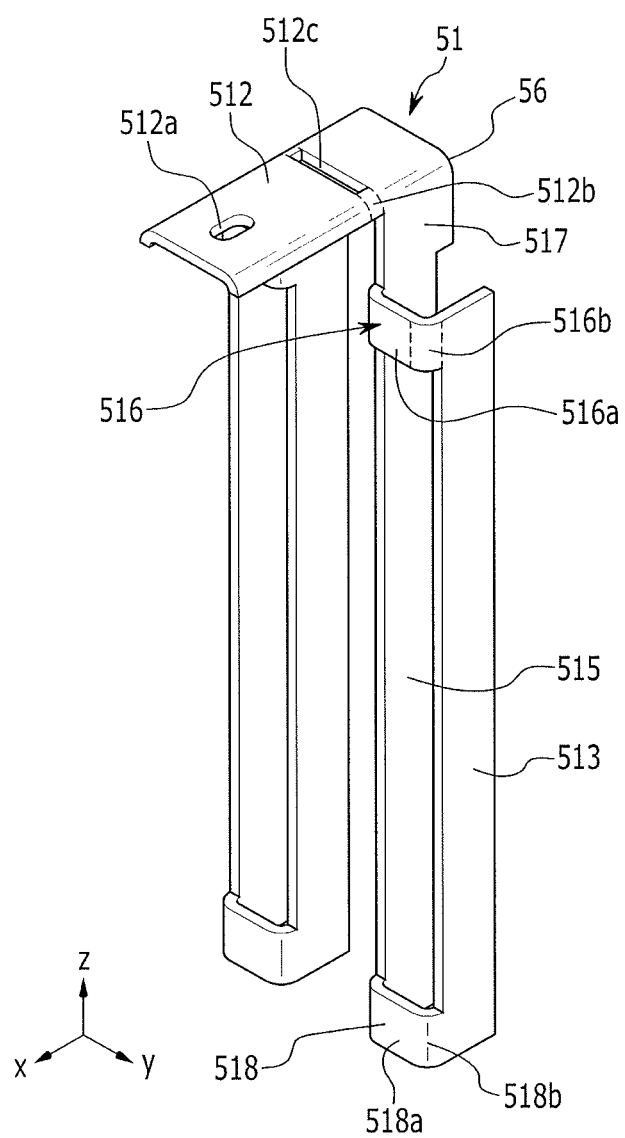
FIG. 6 illustrates a perspective view of the current collecting member according to the exemplary embodiment.

FIG. 3 is a perspective view of the current collecting member and electrode assembly of the rechargeable battery according to the exemplary embodiment. FIG. 4 is a top view of the current collecting member and the electrode assembly of the according to the exemplary embodiment. FIG. 5 is an exploded perspective view of the current collecting member and the electrode assembly according to the exemplary embodiment, and FIG. 6 is a perspective view of the current collecting member according to the exemplary embodiment.

Referring to FIGS. 3-6, the current collecting member 51 may include a terminal connection portion 512 fixed to the positive terminal 21, a side plate 517 formed bent from the terminal connection portion 512, and current collecting plates 513 and 515 fixed to the positive electrode uncoated region 11a. A fuse portion 512b having a smaller width than the periphery region may be formed in the terminal connection portion 512.

The current collecting member 52 formed in the negative terminal 22 may be the same as or similar to the current collecting member 51 in structure, excluding the fuse portion 512b. Therefore, a description of the similar features will not be repeated.

The terminal connection portion 512 may be formed in the shape of a square or rectangular plate. A hole 512a into which the positive terminal 21 is inserted may be formed in a center thereof. Further, the terminal connection portion 512 may be welded to the lower portion of the positive terminal 21. The fuse portion 512b may have a smaller width than the peripheral region. For example, a hole 512c may be formed in the fuse portion 512b. The hole 512c may be extended along a width direction (y-axis direction in FIG. 3) of the terminal connection portion 512. Ends of lateral sides the terminal connection portion 512 may be bent downward such that the terminal connection portion 512 may have an arc-shaped cross-section and portions protruding downward may be formed in the ends of the lateral sides of the terminal connection portion 512. The hole 512c may be formed in a center of the terminal connection portion 512, and the protruded portions may also be formed in the fuse portion 512b. When the portions protruding downward are formed in the ends of the lateral sides of the terminal connection portion 512, as in the present exemplary embodiment, the protruded portions may support a height directional stress of the current collecting member 51 so that breakage of the fuse portion 512b due to the fatigue stress may be prevented.

The side plate 517 may be perpendicularly bent toward the bottom of the case 30 from a width directional end of the terminal connection portion 512. Accordingly, the side plate 517 may be disposed in parallel with the wide front side of the case 30.

The side plate 517 may be bent at a corner formed by being extended along a direction (x-axis direction) that crosses the direction (y-axis direction) along which the fuse portion 512b is extended. The direction along which the fuse portion 512b is extended and the corner where then side plate 517 is bent may be perpendicularly crossed.

If the side plate were to be bent at a length directional end of the terminal connection portion, vertical directional stress applied to the fuse portion could be increased so that the fuse portion could be broken due to vibration or impact. Thus, for stable strength of the fuse portion in such a structure, the fuse portion may require a large width. However, when the fuse portion has a large width, a current generated in a short circuit may not be sufficient to melt the fuse.

However, when the side plate 517 is formed in the width directional end of the terminal connection portion 512 as in the present exemplary embodiment, the stress applied to the fuse portion 512b may be decreased and thus the thickness of the fuse portion 512b can be reduced so that the fuse portion 512b can be activated with a small amount of current.

A current collecting plate 515 may be formed by being extended from a lower portion of the side plate 517. A current collecting plate 513 may be fixed to the current collecting plate 515 using supporting portions 516 and 518. The current collecting plates 513 and 515 may be formed in the shape of an elongated rectangle. The current collecting plates 513 and 515 may be welded to the positive electrode uncoated region 11a.

The supporting portion 516 may be formed in upper portions of the current collecting plates 513 and 515 for connection therebetween in a fixed manner. The supporting portion 518 may be formed in lower portions of the current collecting plates 513 and 515 for connection therebetween in a fixed manner.

The supporting portion 516 provided in the upper portions of the current collecting plates 513 and 515 may include a connection portion 516a arranged opposite to the electrode assembly 10 and guiding portions 516b formed at lateral side ends of the connection portion 516a and fixed to the current collecting plates 513 and 516. The guiding portions 516a may be bent in the shape of an arc. Accordingly, the supporting portion 516 may protrude toward a direction (x-axis direction) facing the electrode assembly 10 from the current collecting plates 513 and 515. The connection portion 516a may be formed in the shape of a square or rectangular plate and the guiding plate 516b may be formed of a curved plate having an arc-shaped cross-section.

The supporting portion 518 provided in the lower portions of the current collecting plates 513 and 515 may include a connection portion 518a arranged opposite to the electrode assembly 10 and guiding portions 518b formed at lateral side ends of the connection portion 518a and fixed to the current collecting plates 513 and 515. The guiding portions 518b may be bent in the shape of an arc. Accordingly, the supporting portion 518 may protrude toward a direction (x-axis) facing the electrode assembly 10 from the current collecting plates 513 and 515. The connection portion 518a may be formed in the shape of a square or rectangular plate, and the guiding portion 518b may be formed of a curved plate having an arc-shaped cross-section.

In the electrode assembly 10, the uncoated region where the active material is not coated may be thinner than the coated region where the active material is coated. Therefore, an inclined face 10a may be formed in a portion where the uncoated region and the coated region are connected.

The guiding portions 516b and 518 may contact the inclined face 10a formed in the electrode assembly 10 to prevent the electrode assembly 10 from moving due to impact and vibration. Movement of the electrode assembly 10 due to vibration may cause an electrical contact failure between the current collecting member 51 and the positive electrode uncoated region 11a or an electrical contact failure between the current collecting member 51 and the positive terminal 21. In addition, if the electrode assembly 10 were to be severely moved, the electrode assembly 10 could contact the case 30, thereby causing a short circuit.

However, according to the present exemplary embodiment, the current collecting member 51 may support the electrode assembly 10 to prevent movement of the electrode assembly 10. Accordingly, safety of the rechargeable battery 101 may be improved.

Further, the supporting portions 516 and 518 may support the current collecting plates 513 and 515 to prevent the current collecting plates 513 and 515 from moving in a direction (y-axis direction) along which the electrode assembly 10 is layered. Thus, an electrical connection failure between the current collecting plates 513 and 515 and the positive electrode uncoated region 11a may be prevented.

In the current collecting member 51, insulating members 55 and 57 may be attached to portions facing the inside of the case 30. The current collecting member 51 may include a protrusion 56 protruding further to the outside than the current collecting plates 513 and 515 from the terminal connection portion 512 and the side plate 517. The insulating members 55 and 57 may be formed as a tape type insulating members so as to be respectively attached to each end of the protrusion 56 and the current collecting plate 513.

As in the present exemplary embodiment, the insulating members 55 and 57 may be provided to prevent short circuit due to contact of the case 30 and the current collecting member 51.

Figure 7:
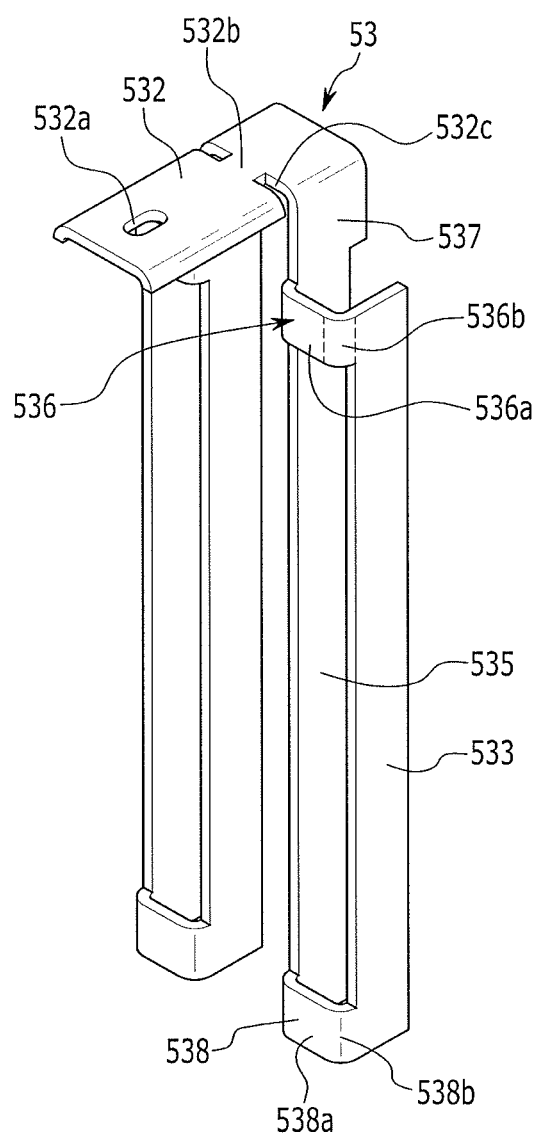
FIG. 7 illustrates a perspective view of a current collecting member of a rechargeable battery according to another exemplary embodiment.

FIG. 7 is a perspective view of a current collecting member of a rechargeable battery according to another exemplary embodiment.

The rechargeable battery according to the present exemplary embodiment may be the same as or similar to the rechargeable battery of the exemplary embodiment of FIGS. 1 to 6, excluding the structure of a current collecting member 53. A description of similar features will not be repeated.

Referring to FIG. 7, the current collecting member 53 may include a terminal connection portion 532 fixed to a positive terminal 21, a side plate 537 formed by being bent from the terminal connection portion 532, and current collecting plates 533 and 535 fixed to a positive electrode uncoated region 11a. In the terminal connection portion 532, a fuse portion 532b having a smaller width than the periphery region may be formed.

The current collecting member provided in a negative terminal 22 may be the same as or similar to the current collecting member 53 in structure, excluding the fuse portion 532b, and therefore a description of similar features will not be repeated.

The terminal connection portion 532 may be formed in the shape of a square or rectangular plate, and a hole 532a into which the positive terminal 21 is inserted may be formed in a center of the terminal connection portion 532. Further, the terminal connection portion 532 may be welded to a lower portion of the positive terminal 21. The fuse portion 532b may have a smaller width than the peripheral region, and thus, a hole 532c may be formed in the fuse portion 532b. The hole 532c may be formed to extend to a side end of the terminal connection portion 532 from lateral side ends of the fuse portion 532b.

The side plate 537 may be perpendicularly bent toward the bottom of the case 30 from a width directional end of the terminal connection portion 532. Accordingly, the side plate 537 may be disposed in parallel with a wide front side of the case 30.

That is, the side plate 537 may be bent at a corner formed to extend in a direction crossing a direction in which the fuse portion 512b extends. The direction in which the fuse portion 532b extends and the corner at which the side plate 537 is bent may be perpendicularly crossed with each other.

If the side plate were to be bent at a length directional end of the terminal connection portion, a vertical directional stress applied to the fuse portion could be increased so that the fuse portion could be broken due to vibration or impact.

However, when the side plate 537 is formed in the width directional end of the terminal connection portion 532 as in the present exemplary embodiment, the stress applied to the fuse 532b may be decreased, and thus, the thickness of the fuse portion 532b may be decreased so that the fuse portion 532b may be activated with a small amount of current.

The current collecting plates 535 may be formed by being extended from a lower portion of the current collecting side plate 537. A current collecting plate 533 may be formed in the current collecting plate 535 in a fixed manner using the supporting portions 536 and 538. The current collecting plates 533 and 535 may be formed in the shape of an elongated rectangular plate and may be welded to the positive electrode uncoated region 11a.

The supporting portion 536 may be formed in upper portions of the current collecting plates 533 and 535 for connection therebetween in a fixed manner. The supporting portion 538 may be formed in lower portions of the current collecting plates 533 and 535 for connection therebetween in a fixed manner.

The supporting portion 536 provided in the upper portions of the current collecting plates 533 and 535 may include a connection portion 536a arranged opposite to the electrode assembly 10 and guiding portions 536b formed at lateral side ends of the connection portion 536a and then fixed to the current collecting plates 533 and 536. The guiding portions 536a may be bent in the shape of an arc. Thus, the supporting portion 536 may protrude toward a direction facing the electrode assembly 10 from the current collecting plates 533 and 535. The connection portion 536a may be formed in the shape of a square or rectangular plate and the guiding plate 536b may be formed in the shape of a curved plate having an arc-shaped cross-section.

The supporting portion 538 provided in the lower portions of the current collecting plates 533 and 535 may include a connection portion 538a arranged opposite to the electrode assembly 10 and guiding portions 538b formed at lateral side ends of the connection portion 538a and fixed to the current collecting plates 533 and 535. The guiding portions 538b may be bent in the shape of an arc. Accordingly, the supporting portion 538 may protrude toward a direction facing the electrode assembly 10 from the current collecting plates 533 and 535. The connection portion 538a may be formed in the shape of a square or rectangular plate, and the guiding portion 538b may be formed in the shape of a curved plate having an arc-shaped cross-section.

In the electrode assembly 10, an uncoated region where an active material is not coated may be thinner than a coated region where the active material is coated. Therefore, an inclined face 10a may be formed in a portion where the uncoated region and the coated region are connected.

The guiding portions 536b and 538 may contact the inclined face 10a formed in the electrode assembly 10 to prevent the electrode assembly 10 from moving due to impact and vibration.

Figure 8:
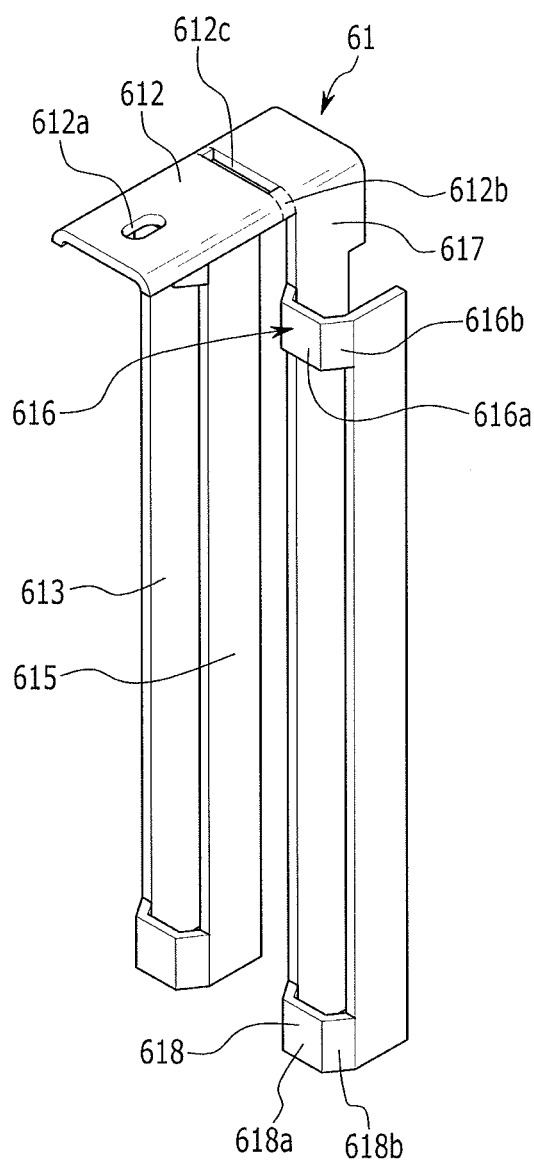
FIG. 8 illustrates a perspective view of a current collecting member of a rechargeable battery according to another exemplary embodiment.

FIG. 8 is a perspective view of a current collecting member of a rechargeable battery according to another exemplary embodiment.

The rechargeable battery according to the present exemplary embodiment may be the same as or similar to the rechargeable battery of the exemplary embodiment of FIGS. 1 to 6, excluding a structure of a current collecting member 61, and therefore, a description of similar features will not be repeated.

Referring to FIG. 8, the current collecting member 61 may include a terminal connection portion 612 fixed to a positive terminal 21, a side plate 617 formed by being bent from the terminal connection portion 612, and current collecting plates 613 and 615 fixed to a positive electrode uncoated region 11a. In the terminal connection portion 612, a fuse portion 612b having a smaller width than the periphery region may be formed.

The current collecting member provided in a negative terminal 22 may be the same as or similar to the current collecting member 61 in structure, excluding the fuse portion 612b, and therefore, a description of similar features will not be repeated.

The terminal connection portion 612 may be formed in the shape of a square or rectangular plate, and a hole 612a into which the positive terminal 21 is inserted may be formed in a center of the terminal connection portion 612. Further, the terminal connection portion 612 may be welded to a lower portion of the positive terminal 21. The fuse portion 612b may have a smaller width than the peripheral region, and thus a hole 612c may be formed in the fuse portion 612b. The hole 612c may be extended in a width direction of the terminal connection portion 612. Ends of lateral sides of the terminal connection portion 612 may be bent downward such that the terminal connection portion 612 may have an arc-shaped cross-section. Portions protruding downward may be formed in the ends of the lateral sides of the terminal connection portion 612. The hole 612c may be formed in a center of the terminal connection portion 612, and the protruded portions may also be formed in the fuse portion 612b.

The side plate 617 may be perpendicularly curved toward the bottom of the case 30 from a width directional end of the terminal connection portion 612. Thus, the side plate 617 may be disposed in parallel with a wide front side of the case 30.

That is, the side plate 617 may be bent at a corner formed by being extended along a direction that crosses the direction along which the fuse portion 612b extends. The direction along which the fuse portion 612b extends and the corner where then side plate 617 is bent may be perpendicularly crossed.

If the side plate were to be bent at a length directional end of the terminal connection portion, vertical directional stress applied to the fuse portion could be increased so that the fuse portion 612b could be broken due to vibration or impact.

However, when the side plate 617 is formed in the width directional end of the terminal connection portion 612 as in the present exemplary embodiment, the stress applied to the fuse portion 612b may be decreased, and thus, the thickness of the fuse portion 612b may be reduced so that the fuse portion 612b can be activated with a small amount of current.

A current collecting plate 615 may be formed by being extended from a lower portion of the side plate 617, and a current collecting plate 613 may be fixed to the current collecting plate 615 using supporting portions 616 and 618. The current collecting plates 613 and 615 may be formed in the shape of an elongated rectangle. The current collecting plates 613 and 615 may be welded to the positive electrode uncoated region 11a.

The supporting portion 616 may be formed in upper portions of the current collecting plates 613 and 615 for connection therebetween in a fixed manner. The supporting portion 618 may be formed in lower portions of the current collecting plates 613 and 615 for connection therebetween in a fixed manner.

The supporting portion 616 provided in the upper portions of the current collecting plates 613 and 615 may include a connection portion 616a disposed facing the electrode assembly 10 and extended in a direction toward the other current collecting plate 615 from one current collecting plate 613 and guiding portions 616b provided at lateral side ends of the connection portion 616a and fixed to the current collecting plates 613 and 615. The guiding portions 616b may be inclined with respect to the connection portion 616a. Thus, the supporting portion 616 may protrude toward a direction facing the electrode assembly 10 from the current collecting plates 613 and 615. The connection portion 616a may be formed in the shape of a square or rectangular plate, and the guiding portions 616b may be inclined with respect to the current collecting plates 613 and 615 and the connection portion 616a.

The supporting portion 618 provided in the lower portions of the current collecting plates 613 and 615 may include a connection portion 618a disposed facing the electrode assembly 10 and extended toward the other current collecting plate 615 from one current collecting plate 613 and guiding portions 618b provided at lateral side ends of the connection portion 618a and fixed to the current collecting plates 613 and 618. The guiding portions 618b may be inclined with respect to the connection portion 618a. The supporting portion 618 may be formed in the shape of a square plate or rectangle, and the guiding portions 616b may be inclined with respect to the current collecting plates 613 and 615 and the connection portion 616a. The connection portion 618a may be formed in the shape of a square or rectangular plate, and the guiding portions 618b may be inclined with respect to the current collecting plates 613 and 615 and the connection portion 616a.

In the electrode assembly 10, an uncoated region where an active material is not coated may be thinner than a coated region where the active material is coated, and therefore, an inclined face 10a may be formed in a portion where the uncoated region and the coated region are connected.

The guiding portions 616b and 618b may match up in parallel with the inclined face 10a formed in the electrode assembly 10 and may contact the same. The guiding portions 616b and 618b support the electrode assembly 10 in the inclined face 10a to prevent the electrode assembly 10 from moving due to impact or vibration. According to the present exemplary embodiment, the contact area between the guiding portions 616b and 681b and the inclined face 10a may be increased so that the guiding portions 616b and 618b may further stably support the electrode assembly 10.

Figure 9:
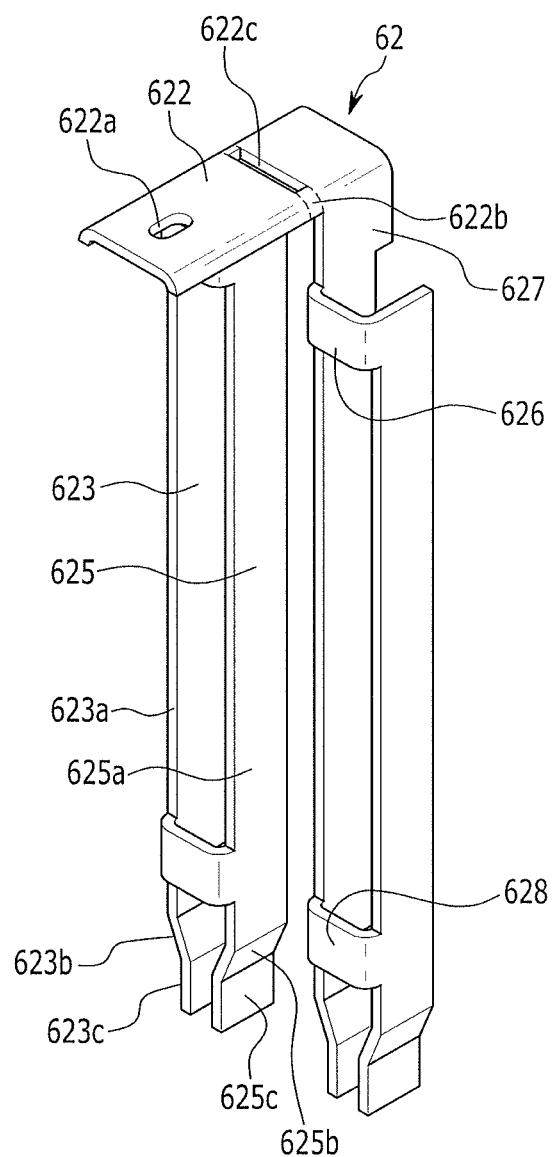
FIG. 9 illustrates a perspective view of a current collecting member of a rechargeable battery according to another exemplary embodiment.

FIG. 9 is a perspective view of a current collecting member of a rechargeable battery according to another exemplary embodiment.

The rechargeable battery according to the present exemplary embodiment may be the same as or similar to the rechargeable battery of the exemplary embodiment of FIGS. 1 to 6, excluding a structure of a current collecting member 62, and therefore a description of similar features will not be repeated.

Referring to FIG. 9, the current collecting member 62 may include a terminal connection portion 622 fixed to a positive terminal 21, a side plate 627 formed by being bent from the terminal connection portion 622, and current collecting plates 623 and 625 fixed to a positive electrode uncoated region 11a. In the terminal connection portion 622, a fuse portion 622b having a smaller width than the periphery region may be formed.

The current collecting member provided in a negative terminal 22 may be the same as or similar to the current collecting member 62 in structure, excluding the fuse portion 622b, and therefore a description of the similar features will not be repeated.

The terminal connection portion 622 may be formed in the shape of a square or rectangular plate, and a hole 622a into which the positive terminal 21 is inserted may be formed in a center of the terminal connection portion 622. Further, the terminal connection portion 622 may be welded to a lower portion of the positive terminal 21. The fuse portion 622b may have a smaller width than the peripheral region, and thus a hole 622c may be formed in the fuse portion 622b. The hole 622c may be extended in a width direction of the terminal connection portion 622. Ends of lateral sides of the terminal connection portion 622 may be bent downward such that the terminal connection portion 622 has an arc-shaped cross-section, and portions protruding downward may be formed in the ends of the lateral sides of the terminal connection portion 622. The hole 622c may be formed in a center of the terminal connection portion 622, and the protruded portions may also be formed in the fuse portion 622b.

The side plate 627 may be perpendicularly curved toward the bottom of the case 30 from a width directional end of the terminal connection portion 622. Thus, the side plate 627 may be disposed in parallel with a wide front side of the case 30.

That is, the side plate 627 may be bent at a corner formed by being extended along a direction that crosses the direction along which the fuse portion 622b extends. The direction along which the fuse portion 622b extends and the corner where then side plate 627 is bent may be perpendicularly crossed.

If the side plate were to be bent at a length directional end of the terminal connection portion, vertical directional stress applied to the fuse portion could be increased so that the fuse portion could be broken due to vibration or impact.

However, when the side plate 627 is formed in the width directional end of the terminal connection portion 622 as in the present exemplary embodiment, the stress applied to the fuse portion 622b may be decreased. Thus, the thickness of the fuse portion 622b can be reduced so that the fuse portion 622b can be activated with a small amount of current.

A current collecting plate 625 may be formed by being extended from a lower portion of the side plate 627, and a current collecting plate 623 may be fixed to the current collecting plate 625 using supporting portions 626 and 628.

The current collecting plates 623 may be formed in the shape of an elongated rectangular plate, and may include a welding bar 623a welded to a positive electrode uncoated region 11a, a bent bar 623b formed in a lower portion of the welding bar 623a and bent toward the opposite current collecting plate 625, and an insertion tip 623c formed at an end portion of the bent bar 623b. The bent bar 623b may be inclined in a direction to the outside from the center of the electrode assembly 10 to which the welding bar 623b is attached, and may be inclined with an angle of about 5° to about 90°. The insertion tip 623c may be formed at an end portion of the bent bar 623b and may spaced apart from the positive electrode uncoated region 11a. Thus, a distance between two facing insertion tips 623c may be smaller than a distance between facing welding bars 623a. However, the insertion tip 623c may be disposed further inside than the interface between the electrode assemblies 10 so that the facing insertion tips 625c do not contact.

Thus, the current collecting member 62 can be easily inserted between the electrode assemblies 10 without causing damage to the positive electrode uncoated region 11a. The insertion may be performed while the insertion tip 623c is spaced apart from the positive electrode uncoated region 11a.

Further, since the welding bar 623a is designed to be closely attached to the positive electrode uncoated region 11a, the insertion tip 623c may be inserted while being spaced apart from the positive electrode uncoated region 11a when the welding bar 623a presses the positive electrode uncoated region 11a so that the current collecting member 62 can be easily inserted. As described, when the current collecting member 62 is provided in a manner that makes the welding bar 623a press the positive electrode uncoated region 11a, the welding bar 623a and the positive electrode uncoated region 11a may be closely attached to each other so that a contact failure between the current collecting member 62 and the positive electrode uncoated region 11a due to external impact or vibration may be prevented.

The current collecting plates 625 may be formed in the shape of an elongated rectangular plate, and may include a welding bar 625a welded to a positive electrode uncoated region 11a, a bent bar 625b formed in a lower portion of the welding bar 625a and bent toward the opposite current collecting plate 623, and an insertion tip 625c formed at an end portion of the bent bar 625b. The bent bar 625b may be inclined in a direction to the outside from the center of the electrode assembly 10 to which the welding bar 625b is attached, and may be inclined with an angle of about 5° to about 90°. The insertion tip 625c may be formed at an end portion of the bent bar 625b and may be spaced apart from the positive electrode uncoated region 11a. Thus, a distance between two facing insertion tips 625c may be smaller than a distance between facing welding bars 625a. However, the insertion tip 625c may be disposed further inside than the interface between the electrode assemblies 10 so that the facing insertion tips 623c do not contact.

Thus, the current collecting member 62 can be easily inserted between the electrode assemblies 10 without causing damage to the positive electrode uncoated region 11a because the insertion may be performed while the insertion tip 625c is spaced apart from the positive electrode uncoated region 11a.

Further, since the welding bar 625a is designed to be closely attached to the positive electrode uncoated region 11a, the insertion tip 625c may be inserted while being spaced apart from the positive electrode uncoated region 11a when the welding bar 625a presses the positive electrode uncoated region 11a so that the current collecting member 62 can be easily inserted. As described, when the current collecting member 62 is provided in a manner that makes the welding bar 625a press the positive electrode uncoated region 11a, the welding bar 625a and the positive electrode uncoated region 11a may be closely attached to each other so that a contact failure between the current collecting member 62 and the positive electrode uncoated region 11a due to external impact or vibration can be prevented.

The supporting portion 626 may be formed in upper portions of the current collecting plates 623 and 625 for connection therebetween in a fixed manner. The supporting portion 628 may be formed in lower portions of the current collecting plates 623 and 625 for connection therebetween in a fixed manner. Here, the supporting portions 626 and 628 may be respectively provided in upper and lower portions of the welding bars 623a and 625a.

Figure 10:
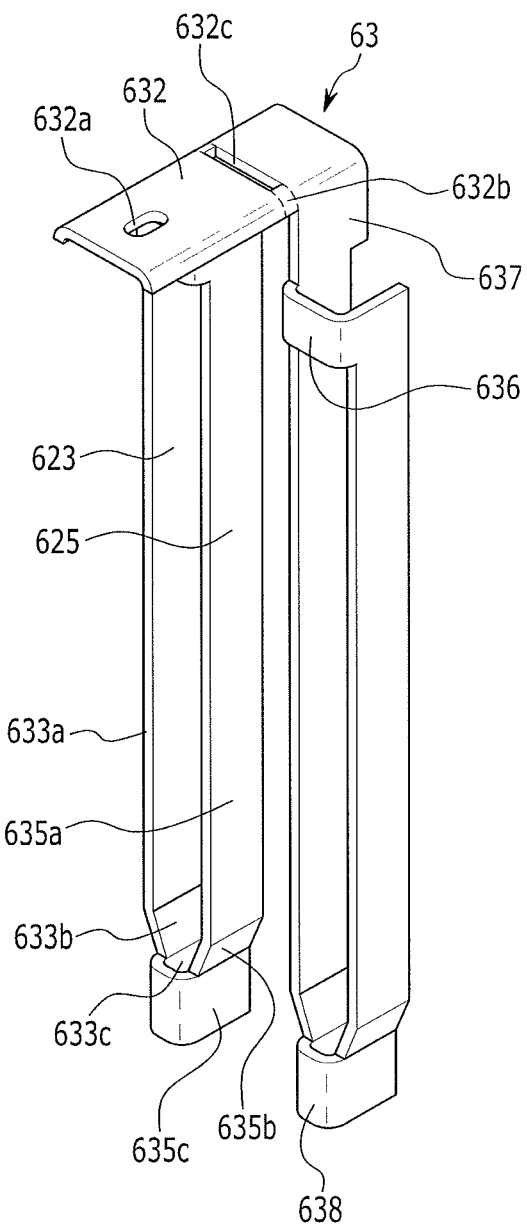
FIG. 10 illustrates a perspective view of a current collecting member of a rechargeable battery according to another exemplary embodiment.

FIG. 10 is a perspective view of a current collecting member of a rechargeable battery according to another exemplary embodiment.

The rechargeable battery according to the present exemplary embodiment may be the same as or similar to the rechargeable battery of the first exemplary embodiment, excluding a structure of a current collecting member 63. Therefore, a description of the similar features will not be repeated.

Referring to FIG. 10, the current collecting member 63 may include a terminal connection portion 632 fixed to a positive terminal 21, a side plate 637 formed by being bent from the terminal connection portion 632, and current collecting plates 633 and 635 fixed to a positive electrode uncoated region 11a. In the terminal connection portion 632, a fuse portion 632b having a smaller width than the periphery region may be formed.

The current collecting member provided in a negative terminal 22 may be the same as or similar to the current collecting member 63 in structure, excluding the fuse portion 632b. Therefore, a description of similar features will not be repeated.

The terminal connection portion 632 may be formed in the shape of a square or rectangular plate, and a hole 632a into which the positive terminal 21 is inserted may be formed in a center of the terminal connection portion 632. Further, the terminal connection portion 632 may be welded to a lower portion of the positive terminal 21. The fuse portion 632b may have a smaller width than the periphery region, and thus a hole 632c may be formed in the fuse portion 632b. The hole 63c may extend in a width direction of the terminal connection portion 632. Ends of lateral sides the terminal connection portion 632 may be bent downward such that the terminal connection portion 632 has an arc-shaped cross-section, and portions protruding downward may be formed in the ends of the lateral sides of the terminal connection portion 632. The hole 632c may be formed in a center of the terminal connection portion 632, and the protruded portions may also be formed in the fuse portion 632b.

The side plate 637 may be perpendicularly curved toward the bottom of the case 30 from a width directional end of the terminal connection portion 632. Thus, the side plate 637 may be disposed in parallel with a wide front side of the case 30.

The side plate 637 may be bent at a corner formed by being extended along a direction that crosses the direction along which the fuse portion 632b extends. The direction along which the fuse portion 632b extends and the corner where then side plate 637 is bent may be perpendicularly crossed.

If the side plate were to be bent at a length directional end of the terminal connection portion, vertical directional stress applied to the fuse portion could be increased so that the fuse portion could be broken due to vibration or impact.

However, when the side plate 637 is formed in the width directional end of the terminal connection portion 632 as in the present exemplary embodiment, the stress applied to the fuse portion 632b may be decreased and thus the thickness of the fuse portion 632b may be reduced so that the fuse portion 632b can be activated with a small amount of current.

A current collecting plate 635 may be formed by being extended from a lower portion of the side plate 637. A current collecting plate 633 may be fixed to the current collecting plate 635 using supporting portions 636 and 638.

The current collecting plates 633 may be formed in the shape of an elongated rectangular plate, and may include a welding bar 633a welded to a positive electrode uncoated region 11a, a bent bar 633b formed in a lower portion of the welding bar 633a and bent toward the opposite current collecting plate 635, and an insertion tip 633c formed at an end portion of the bent bar 633b. The bent bar 633b may be inclined in a direction to the outside from the center of the electrode assembly 10 to which the welding bar 633b is attached, and may be inclined with an angle of about 5° to about 90°. The insertion tip 633c may be formed at an end portion of the bent bar 633b and may be spaced apart from the positive electrode uncoated region 11a. Thus, a distance between two facing insertion tips 633c may be smaller than a distance between facing welding bars 633a. However, the insertion tip 633c may be disposed further inside than the interface between the electrode assemblies 10, so that the facing insertion tips 633c do not contact.

Thus, the current collecting member 63 can be easily inserted between the electrode assemblies 10 without causing damage to the positive electrode uncoated region 11a because the insertion may be performed while the insertion tip 633c is spaced apart from the positive electrode uncoated region 11a.

Further, since the welding bar 633a is designed to be closely attached to the positive electrode uncoated region 11a, the insertion tip 633c may be inserted while being spaced apart from the positive electrode uncoated region 11a when the welding bar 633a presses the positive electrode uncoated region 11a so that the current collecting member 63 can be easily inserted. As described, when the current collecting member 63 is provided in a manner that makes the welding bar 633a press the positive electrode uncoated region 11a, the welding bar 633a and the positive electrode uncoated region 11a may be closely attached to each other so that a contact failure between the current collecting member 63 and the positive electrode uncoated region 11a due to external impact or vibration may be prevented.

The current collecting plates 635 may be formed in the shape of an elongated rectangular plate. The current collecting plates 635 may include a welding bar 635a welded to a positive electrode uncoated region 11a, a bent bar 635b formed in a lower portion of the welding bar 635a and bent toward the opposite current collecting plate 633, and an insertion tip 635c formed at an end portion of the bent bar 635b. The bent bar 635b may be inclined in a direction toward the outside from the center of the electrode assembly 10 to which the welding bar 635b is attached, and may be inclined with an angle of about 5° to about 90°. The insertion tip 635c may be formed at an end portion of the bent bar 635b and may be spaced apart from the positive electrode uncoated region 11a. Thus, a distance between two facing insertion tips 635c may be smaller than a distance between facing welding bars 635a. However, the insertion tip 635c may be disposed further inside than the interface between the electrode assemblies 10 so that the facing insertion tips 633c do not contact.

Thus, the current collecting member 63 can be easily inserted between the electrode assemblies 10 without causing damage to the positive electrode uncoated region 11a because the insertion may be performed while the insertion tip 635c is spaced apart from the positive electrode uncoated region 11a.

Further, since the welding bar 635a is designed to be closely attached to the positive electrode uncoated region 11a, the insertion tip 635c may be inserted while being spaced apart from the positive electrode uncoated region 11a when the welding bar 635a presses the positive electrode uncoated region 11a so that the current collecting member 63 can be easily inserted. As described, when the current collecting member 63 is provided in a manner that makes the welding bar 635a press the positive electrode uncoated region 11a, the welding bar 635a and the positive electrode uncoated region 11a may be closely attached to each other so that a contact failure between the current collecting member 63 and the positive electrode uncoated region 11a due to external impact or vibration can be prevented.

The supporting portion 636 may be formed in upper portions of the current collecting plates 633 and 635 for connection therebetween in a fixed manner. The supporting portion 638 may be formed in lower portions of the current collecting plates 633 and 635 for connection therebetween in a fixed manner. Here, the supporting portion 636 may be fixed to upper portions of the welding bars 623a and 625a, and the supporting portion 638 may be fixed to the insertion tips 633c and 635c.

By way of summation and review, embodiments described herein may provide a rechargeable battery that is improved in safety. Supporting portions connecting the current collecting plates and contacting an inclined portion formed in the electrode assembly may supports the electrode assembly to prevent movement of the electrode assembly due to impact or vibration so that a short-circuit between the electrode assembly and the case can be prevented.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope as set forth in the following claims.

What is claimed is:

1. A battery, comprising:
a plurality of electrode assemblies, each having an electrode and an electrode uncoated region, such that the plurality of electrode assemblies together present a plurality of electrodes and electrode uncoated regions;
an electrode terminal; and
a current collecting member electrically connecting the electrode terminal and the plurality of electrodes of the electrode assemblies, the current collecting member including:
a terminal connection portion, the terminal connection portion including a fuse portion, the fuse portion being a region of reduced area in the terminal connection portion;
a plurality of side plates, each of the side plates extending from a respective one of lateral sides of the terminal connection portion;
a plurality of current collecting plates, each current collecting plate contacting the electrode uncoated region of a respective one of the plurality of electrode assemblies; and
a plurality of supporting portions, each supporting portion connecting certain adjacent ones of the current collecting plates together,
each of the side plates being coupled with at least one of the current collecting plates.

2. The battery as claimed in claim 1, wherein each of the side plates is coextensive and integral with one of the current collecting plates.

3. The battery as claimed in claim 1, wherein:
the terminal connection portion includes an electrode terminal contacting portion and a side plate connecting portion,
the terminal connection portion includes bent lateral sides,
the bent lateral sides of the terminal connection portion in the electrode terminal contacting portion form lateral edge portions of the electrode terminal contacting portion, and
the bent lateral sides of the terminal connection portion in the side plate connecting portion form the side plates.

4. The battery as claimed in claim 3, wherein the fuse portion includes a hole that extends between the bent lateral sides of the terminal connection portion.

5. The battery as claimed in claim 1, wherein the supporting portions connect selected pairs of the current collecting plates together.

6. The battery as claimed in claim 1, wherein the supporting portions contact respective adjacent ones of the electrode assemblies.

7. The battery as claimed in claim 1, wherein:
the supporting portions each include a connecting part and guiding portions at lateral side ends of the connecting part,
the guiding portions connect the connecting part to the adjacent ones of the current collecting plates, and
the guiding portions contact inclined faces of the electrode assemblies.

8. The battery as claimed in claim 7, wherein the guiding portions are each bent in a shape of an arc extending between the connecting part and the adjacent ones of the current collecting plates.

9. The battery as claimed in claim 8, wherein:
the guiding portions each form an inclined angle between the connecting part and the adjacent ones of the current collecting plates, and
the inclined angle of each guiding portion matches an angle of the inclined faces of the electrode assemblies.

10. The battery as claimed in claim 1, wherein the supporting portions include upper supporting portions that connect the adjacent ones of the current collecting plates at a proximal end of the current collecting plates relative to one of the side plates and lower supporting portions that connect the adjacent ones of the current collecting plates at a distal end of the current collecting plates.

11. The battery as claimed in claim 10, wherein the adjacent ones of the current collecting plates include:
welding bar portions welded to the electrode uncoated regions of one of the electrode assemblies,
bent bar portions, in which the adjacent ones of the current collecting plates bend inwardly toward each other, and
insertion tip portions at lower ends of the adjacent ones of the current collecting plates.

12. The battery as claimed in claim 11, wherein each of the bent bar portions bends at an angle of about 5° to about 90° with respect to one of the welding bar portions.

13. The battery as claimed in claim 11, wherein:
the welding bar portions and insertion tip portions of the adjacent ones of the current collecting plates are parallel to each other.

14. The battery as claimed in claim 11, wherein a distance between the insertion tip portions of the adjacent ones of the current collecting plates is less than a distance between the welding bar portions of the adjacent ones of the current collecting plates.

15. The battery as claimed in claim 13, wherein each of the lower supporting portions connects together the welding bar portions of the adjacent ones of the current collecting plates at a location adjacent to the bent bar portions.

16. The battery as claimed in claim 13, wherein each of the lower supporting portions connects the insertion tip portions of the adjacent ones of the current collecting plates.

17. A battery, comprising:
a plurality of electrode assemblies, each having an electrode and an electrode uncoated region, such that the plurality of electrode assemblies together present a plurality of electrodes and electrode uncoated regions;
an electrode terminal; and
a current collecting member electrically connecting the electrode terminal and the plurality of electrodes of the electrode assemblies, the current collecting member including:
a terminal connection portion;
a plurality of side plates, each of the side plates extending from a respective one of lateral sides of the terminal connection portion;
a plurality of current collecting plates, each current collecting plate contacting the electrode uncoated region of a respective one of the plurality of electrode assemblies; and
a plurality of supporting portions, each supporting portion connecting certain adjacent ones of the current collecting plates together,
each of the side plates being coupled with at least one of the current collecting plates;
a case within which the plurality of electrode assemblies and the current collecting member are disposed, and
insulating members on portions of the current collecting member facing an inside surface of the case.

18. A battery, comprising:
a plurality of electrode assemblies, each having an electrode and an electrode uncoated region, such that the plurality of electrode assemblies together present a plurality of electrodes and electrode uncoated regions;
an electrode terminal; and
a current collecting member electrically connecting the electrode terminal and the plurality of electrodes of the electrode assemblies, the current collecting member including:
  a terminal connection portion;
  a plurality of side plates, each of the side plates extending from a respective one of lateral sides of the terminal connection portion;
  a plurality of current collecting plates, each current collecting plate contacting the electrode uncoated region of a respective one of the plurality of electrode assemblies; and
  a plurality of supporting portions, each supporting portion connecting certain adjacent ones of the current collecting plates together,
  each of the side plates being coupled with at least one of the current collecting plates,
wherein the current collecting plates, supporting portions, side plates, and the terminal connection portion of the current collecting member are formed of a same material and are integral with one another.

* * * * *